Aug. 27, 1935.    R. R. SNYDER    2,012,408
TROLLEY EAR
Filed Dec. 28, 1933
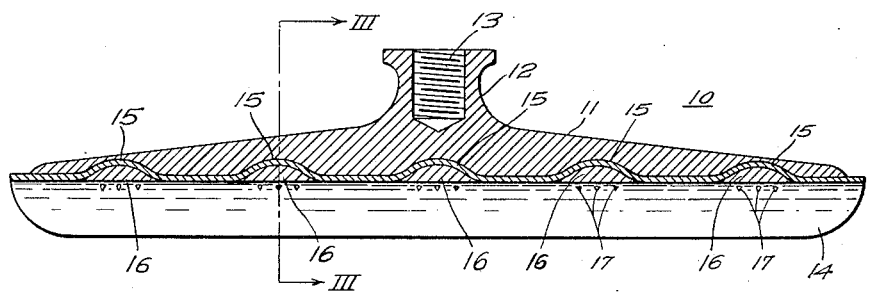
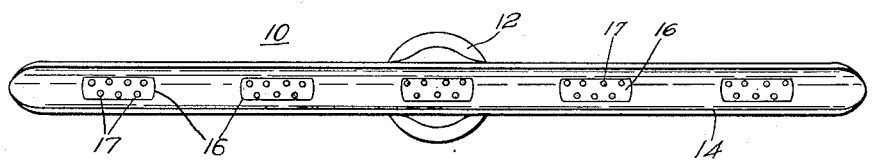
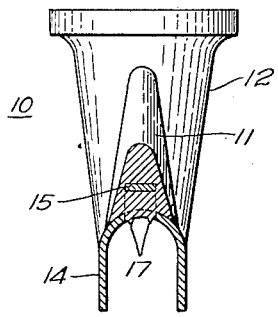
WITNESSES:
C. J. Weller.
R. R. Lockwood
INVENTOR
Rolla R. Snyder.
BY
ATTORNEY Patented Aug. 27, 1935

2,012,408

UNITED STATES PATENT OFFICE 2,012,408

TROLLEY EAR

Rolla R. Snyder, Swissvale, Pa., assignor to Westinghouse Electric & Manufacturing Company, East Pittsburgh, Pa., a corporation of Pennsylvania Application December 28, 1933, Serial No. 704,295

4 Claims. (Cl. 191—43)

My invention relates, generally, to support means for trolley wires and it has particular relation to trolley ears.

My invention constitutes an improvement on the trolley ear illustrated and described in Patent No. 1,729,904, issued October 1, 1929, to J. H. Stotlemeyer and assigned to the assignee of this application.

When a trolley ear of the type shown in the above-identified patent is constructed, it has been found that there is a tendency for it to move, both longitudinally and rotatively with respect to the trolley wire, even after it has been crimped around it. This is due to the fact that the channel member is composed of copper which ordinarily does not provide a relatively great frictional force when in engagement with a trolley wire of like material. Although the trolley ear may be very carefully crimped around the trolley wire, under certain instances of special stress and torsion, it is likely to become displaced and to be moved relative thereto.

This particular undesired relative movement of the trolley ear with respect to the trolley wire also often occurs with other types of trolley ears which are formed integrally as a single unit and of a material such as brass instead of the construction utilized in the above-identified patent wherein the main body member is composed of a material such as brass, which is harder and tougher than the channel member, which is composed of copper for the purpose of obtaining high conductivity. Even when the trolley ear is composed of brass or a like material, it is often not possible to crimp the depending lips of the ear sufficiently tight around the trolley wire so as to prevent relative movement.

The principal object of my invention is to provide a trolley ear which will securely grip a trolley wire and which may be readily and economically manufactured and installed.

The principal object of my invention is to provide for preventing relative longitudinal and rotational movement of a trolley wire with respect to a trolley ear which supports it.

Another important object of my invention is to provide for integrally forming lugs on the inner surface of a trolley ear in order to prevent relative movement between it and the trolley wire when it is crimped around it.

Still another object of my invention is to provide for integrally forming inwardly extending lugs on a trolley wire ear as a part of the operation in manufacturing it.

Other objects of my invention will, in part, be obvious and, in part, appear hereinafter.

My invention accordingly is disclosed in the embodiment hereof shown in the accompanying drawing and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawing in which:

Figure 1 is a view, partly in side elevation and partly in section, showing a modification of my invention;

Fig. 2 is a view in bottom plan of the trolley ear illustrated in Fig. 1; and

Fig. 3 is an enlarged view taken along the line III—III of Fig. 1.

Referring now particularly to the drawing, the reference character 10 designates, generally, a trolley ear of the same general type as set forth in the above mentioned patent. For the reasons set forth, a trolley ear of the type set forth in this patent is not satisfactory under all operating conditions, and it was to overcome the defects in this trolley ear that this invention was made.

The trolley ear 10 comprises a main body member 11, composed preferably of cast brass, and having a boss 12 provided with internal threads 13 for attachment to any suitable support as is customary in the usual overhead conductor systems. While the main body member 11 may be constructed of other material than brass, it has been found that this particular material offers certain superior advantages which are not found in other materials to the same extent.

In order to support the trolley wire (not shown), an inverted U-shaped channel member 14 is provided, and it is preferably constructed of copper in order to increase the electrical conductivity thereof to a maximum. Another advantage of the copper construction is that the channel member 14 comprising this material may be readily crimped around the trolley wire without the danger of its being broken, as is often the case when lips of cast material are crimped around trolley wires.

A plurality of up-standing loops 15 are integrally formed with the channel member 14 on the upper surface thereof and may be pressed from it by any suitable means, as will be readily understood. The formation of the loops 15 not only provides transverse openings across the top of the channel member 14, but their removal from its upper surface also provides an opening therein. While it is not essential that the loops 15 be continuous, it has been found desirable to so form them from a manufacturing standpoint. However, it will be readily apparent that they may comprise merely up-struck lugs, or their equivalent, and it is not essential that they be continuous as is shown in the drawing.

In the manufacture of the trolley ear 10, a suitable mould is placed in and around the channel member 14 and the metal forming the main body member 11 is poured into the mould thereby filling the transverse openings underneath the loops 15 and providing surface portions 16 of cast material in continuation of the inner surface of the channel member 14.

In order to provide for preventing relative movement between the trolley wire and the channel member 14 a plurality of projections 17 are integrally formed or cast on the under surfaces of the portions 16 which are adapted to come into engagement with the upper side of the trolley wire. The projections 17 may be formed by providing suitable corresponding cavities or openings in the mould which is placed within the channel member 14 during the process of manufacture. The shape of the projections 17 is preferably conical in order to provide for ready penetration into the trolley wire when the lips of the channel member 14 are crimped around it. However, it will be understood that the projections 17 may be of any other suitable shape such as in the form of a pyramid, longitudinal lugs or the like, all preferably being provided with sharp edges for penetrating the trolley wire.

In certain instances it may also be desirable to knurl or otherwise roughen the inner surface of the ear in order to provide the desired frictional engagement between it and the trolley wire. However, this means is not generally as effective as the provision of the integrally formed projections 17.

When the trolley ear 10 is installed, it is mounted on the usual overhead support by rotating it around a suitable bolt which is disposed in threaded engagement with the threads 13 on the boss 12 until it is properly aligned with the overhead conductor or wire. The lips or depending sides of the channel member 14 are tightly crimped around the trolley wire by any suitable means. This crimping action forces the trolley wire into engagement with the upper and inner surface of the channel member 14 and into engagement with the downwardly extending projections 17.

Since the projections 17 are formed of a material which is harder than copper, the wire will be readily penetrated by them, and thereby will be secured against any relative rotational or longitudinal movement. Since a relatively large number of the projections 17 may be used, it is then not necessary to form them of any considerable size. Therefore, the projection thereof into the trolley wire is not sufficient to impair its tension characteristics to even the slightest extent. Sufficient penetration, however, is provided in order to overcome the normal tension and twisting stresses which are ordinarily applied to a trolley wire in overhead service.

Since certain further changes may be made in the above construction, and different embodiments of the invention may be made without departing from the scope thereof, it is intended that all matter contained in the above description or shown in the accompanying drawing shall be interpreted as illustrative and not in a limiting sense.

I claim as my invention:

1. A trolley wire ear comprising, in combination, an inverted U-shaped copper carrying member for gripping the wire and having holding means integrally formed therewith, a body member composed of a material harder than copper interlocked with the carrying member by casting around the holding means and forming portions in continuation of the inner surface of the carrying member, and a plurality of integrally formed projections extending from said portions for engaging the trolley wire when the carrying member is crimped around it, thereby preventing relative movement between the trolley ear and the trolley wire.

2. A trolley wire ear comprising, in combination, an inverted U-shaped copper carrying member adapted to be crimped around a trolley wire and provided with a plurality of integrally formed upstanding loops on the upper surface thereof, a body member composed of brass interlocked with the carrying member by casting around said loops, thereby forming portions in continuation of the inner surface of the carrying member, and a plurality of projections integrally formed on said portions and extending inwardly to penetrate the trolley wire when the carrying member is crimped around it, thereby preventing relative movement between the trolley ear and the trolley wire.

3. A trolley wire device comprising, in combination, an inverted U-shaped carrying member of relatively soft material for gripping the wire and having holding means secured thereto, a body member composed of a relatively hard material interlocked with the carrying member by casting around the holding means and forming portions in continuation of the inner surface of the carrying member, and a plurality of integrally formed projections extending from said portions for engaging the trolley wire when the carrying member is crimped around it, thereby preventing relative movement between the trolley device and the trolley wire.

4. A trolley wire device comprising, in combination, an inverted U-shaped carrying member of relatively soft material adapted to be crimped around a trolley wire and provided with a plurality of integrally formed upstanding loops on the upper surface thereof, a body member of relatively hard material interlocked with the carrying member by casting around said loops, thereby forming portions in continuation of the inner surface of the carrying member, and a plurality of projections integrally formed on said portions and extending inwardly to penetrate the trolley wire when the carrying member is crimped around it, thereby preventing relative movement between the trolley device and the trolley wire.

ROLLA R. SNYDER.